United States Patent
Chen

(10) Patent No.: US 10,224,735 B2
(45) Date of Patent: Mar. 5, 2019

(54) ELECTRONIC DEVICE FOR CHARGING AND CHARGING METHOD THEREOF

(71) Applicant: CANYON SEMICONDUCTOR INC., Hsinchu (TW)

(72) Inventor: Chi-Ming Chen, Hsinchu (TW)

(73) Assignee: CANYON SEMICONDUCTOR INC., Hinschu (TW)

( * ) Notice: Subject to any disclaimer, the term of this patent is extended or adjusted under 35 U.S.C. 154(b) by 412 days.

(21) Appl. No.: 15/152,283

(22) Filed: May 11, 2016

(65) Prior Publication Data
US 2016/0344229 A1 Nov. 24, 2016

(30) Foreign Application Priority Data
May 19, 2015 (TW) .............................. 104115835 A

(51) Int. Cl.
*H01M 10/44* (2006.01)
*H01M 10/46* (2006.01)
*H02J 7/02* (2016.01)

(52) U.S. Cl.
CPC .................................... *H02J 7/022* (2013.01)

(58) Field of Classification Search
CPC ......... H02J 2007/006; H02J 2007/0059; H02J 2007/0096

USPC .......................... 320/107, 114, 115, 128, 132
See application file for complete search history.

(56) References Cited

U.S. PATENT DOCUMENTS

| | | | | |
|---|---|---|---|---|
| 4,831,358 A | * | 5/1989 | Ferrio | G06F 13/366 370/439 |
| 5,218,682 A | * | 6/1993 | Frantz | G06F 13/4077 710/105 |
| 2008/0150366 A1 | * | 6/2008 | Adest | H02M 3/1582 307/77 |
| 2014/0188516 A1 | * | 7/2014 | Kamen | G06F 19/3406 705/3 |

* cited by examiner

*Primary Examiner* — Edward Tso
(74) *Attorney, Agent, or Firm* — Christensen, Fonder, Dardi & Herbert PLLC

(57) ABSTRACT

An electronic device includes a voltage converter configured to provide an output having an output voltage value and an output current value. The electronic device also includes a handshake control unit a handshake control unit, coupled to the voltage converter, configured to perform a handshake process for a charging voltage value and receive a matching result of the handshake process. The electronic device further includes a matching management unit, coupled to the handshake control unit, configured to send a first request for resuming matching to the handshake control unit in response to the matching result as being failed.

15 Claims, 7 Drawing Sheets

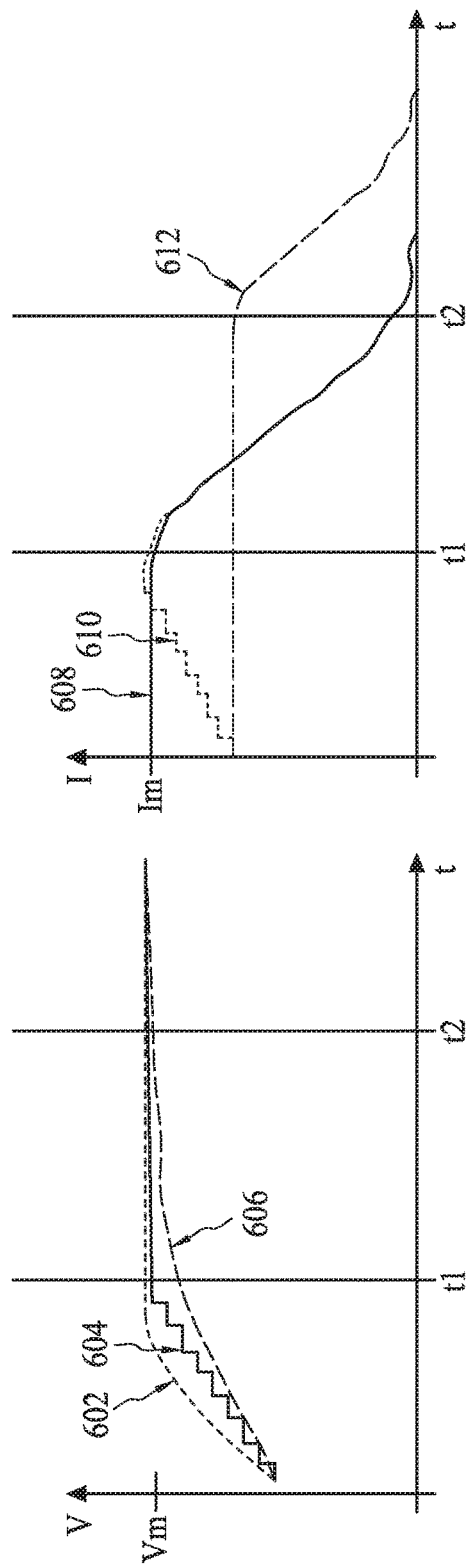

ELECTRONIC DEVICE FOR CHARGING AND CHARGING METHOD THEREOF

CROSS-REFERENCE TO RELATED APPLICATIONS

This application claims priority to Taiwan Application Serial No. 104115835 filed on May 19, 2015, the disclosure of which is hereby incorporated by reference in its entirety.

BACKGROUND

The last decade has witnessed the expanding use of handheld electronic devices. Although handheld devices are easily carried, they rely on power from batteries and further from power supplying devices in case the battery power is exhausted. The charging of handheld electronic devices is completed through a transformer or voltage converter that must comply with specific requirements since the charging voltage is designed as being fixed for a charger and cannot be adapted to different electronic devices.

As the number and types of personal handheld electronic devices increase, the charging requirements and specifications are not unified among different electronic devices. To address the need to charge different electronic devices, one should prepare multiple transformers or voltage converters with different charging standards. Thus, it is desired to improve existing transformers or voltage converters in order to meet the charging requirement of handheld electronic devices.

SUMMARY

The present disclosure provides an electronic device to alleviate these problems. In a first aspect of the present disclosure, an electronic device includes a voltage converter configured to provide an output having an output voltage value and an output current value. The electronic device also includes a handshake control unit a handshake control unit, coupled to the voltage converter, configured to perform a handshake process for a charging voltage value and receive a matching result of the handshake process. The electronic device further includes a matching management unit, coupled to the handshake control unit, configured to send a first request for resuming matching to the handshake control unit in response to the matching result as being failed.

In a second aspect of the present disclosure, a handshake method for charging comprises: sending a first signal comprising at least a predetermined voltage value; receiving a second signal comprising a first matching result; and sending a first request for resuming matching in response to the matching result as being failed.

In a third aspect of the present disclosure, a charging method comprises: determining an output current value and an output voltage value; charging with the output current value and a first voltage value to a power storage unit, wherein the first voltage value is lower than the output voltage value; determining a second voltage value greater than the first voltage value in response to a present voltage value of the power storage unit approaching the first voltage value; and charging with the output current value and the second voltage value.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 6A-6B are schematic views of voltage and current values for the charging method illustrated in FIG. 5, in accordance with some embodiments.

DETAILED DESCRIPTION

Figure 1:
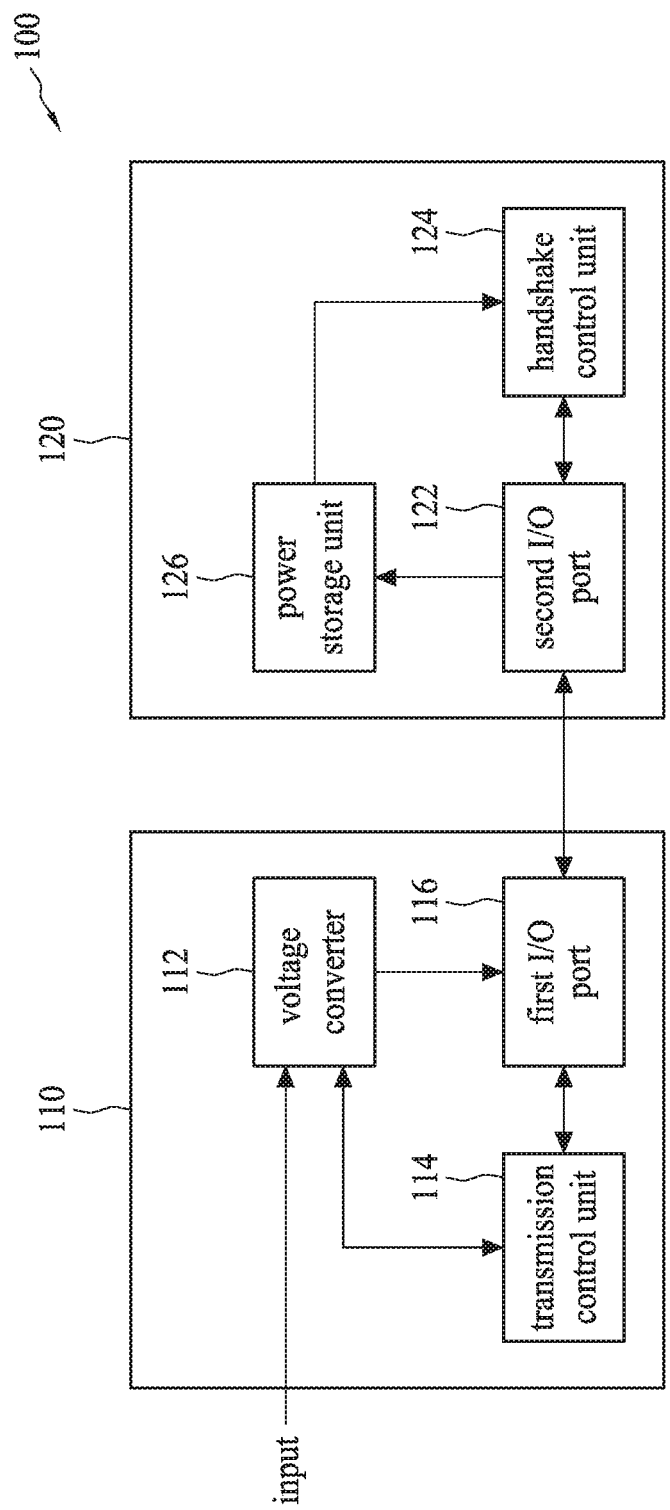
FIG. 1 is a block diagram of a charging system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a block diagram of a charging system 100 in accordance with some embodiments. As shown in FIG. 1, the charging system 100 includes an output device 110 and an input device 120, wherein the output device 110 is configured to charge the input device 120. Furthermore, the output device 110 and the input device 120 are configured to carry out a handshake process for determining a charging voltage value and a charging current value that are compatible with the input device 120. In an embodiment, the output device 110 may be a charger, an adapter or another electronic charging device. In addition, the output device 110 includes a voltage converter 112, a transmission control unit 114 and a first input/output (I/O) port 116.

The voltage converter 112, coupled to an input terminal, is configured to convert the voltage and/or current from the input terminal and provide a converted output power to the first I/O port 116 in a form of DC power. Also, the output power has an output voltage value and an output current value. In some embodiments, the voltage converter 112 receives AC power. In another embodiment, the voltage converter 112 is a regulator.

The transmission control unit 114, coupled to the first I/O port 116, is configured to determine that the first I/O port 116 either starts or stops delivering power to the input device 120. Further, the transmission control unit 114, coupled to the voltage converter 112, is configured to adjust the output voltage value or the output current value of the voltage converter 112. In addition, the transmission control unit 114 is configured to perform a handshake process and generate handshake signals thereof, and transmit the handshake signals to the input device 120 through the first I/O port 116. In some embodiments, the transmission control unit 114 is configured to receive signals of the handshake process from the input device 120 through the first I/O port 116. In other embodiments, the transmission control unit 114 is configured to receive a matching result of the handshake process, where the matching result is determined as successful or failed.

The first I/O port 116 is coupled to the voltage converter 112. In addition, the first I/O port 116 is configured to receive the output power provided by the voltage converter 112. The first I/O port 116 then sends the output power to the input device 120. Furthermore, the first I/O port 116, coupled to the transmission control unit 114, is configured to transmit the handshake signals generated by the transmission control unit 114 to the input device 120. In some embodiments, the first I/O port 116 is a universal serial bus (USB) I/O port.

The input device 120 includes a second input and output (I/O) port 122, a handshake control unit 124 and a power storage unit 126. In some embodiments, the input device 120 is a laptop, handheld computer, smart phone, portable power storage device, or any battery-embedded electronic product. The handshake control unit 124, coupled to the second I/O port 122, is configured to perform the handshake process in conjunction with the transmission control unit 114 of the output device 110. In some embodiments, the handshake control unit 124 is configured to generate handshake signals and transmit those handshake signals to the output device 110 through the second I/O port 122. In another embodiment, the handshake control unit 124 is configured to receive handshake signals sent by the output device 110. In some embodiments, the handshake control unit 124, coupled to the power storage unit 126, is configured to detect a present voltage value and/or a present current value in the power storage unit 126.

The second I/O port 122 is configured to receive the output power transmitted by the first I/O port 116, and the second I/O port 122 transfers the output power to the power storage unit 126. In addition, the second I/O port 122, coupled to the handshake control unit 124, is configured to relay handshake signals between the transmission control unit 114 and the handshake control unit 124. In some embodiments, the second I/O port 122 is a USB I/O port.

Figure 2:
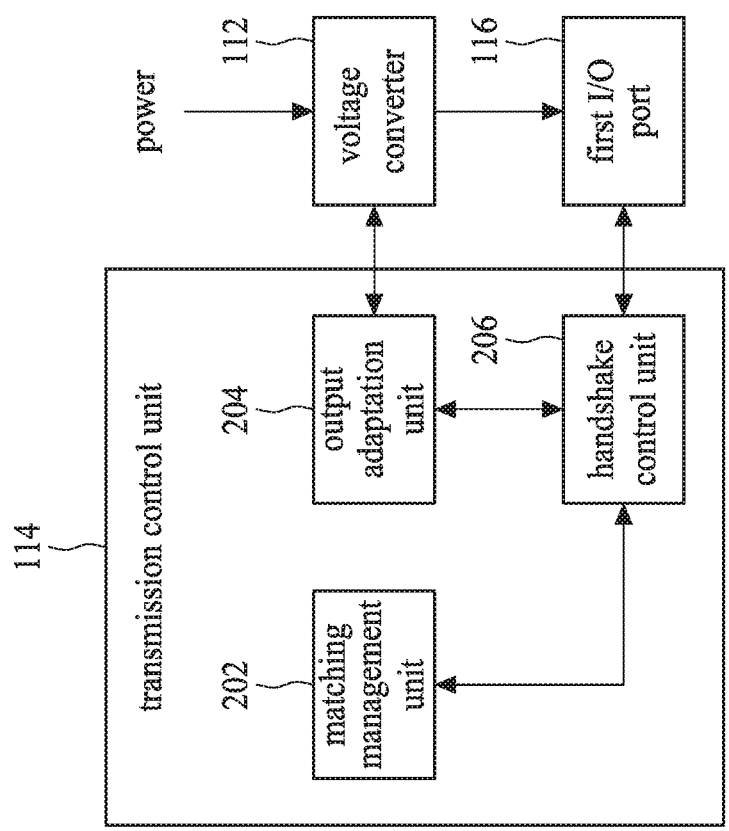
FIG. 2 is a block diagram of a transmission control unit in accordance with some embodiments.

FIG. 2 is a block diagram of the transmission control unit 114 in accordance with some embodiments. Referring to FIG. 2, the transmission control unit 114 includes a matching management unit 202, an output adaptation unit 204 and a handshake control unit 206.

The handshake control unit 206 is configured to perform a handshake process with the handshake control unit 124 of the input device 120 for a charging voltage value so that the maximum output voltage value and the maximum output current value of the voltage converter 112 are determined.

In some embodiments, the handshake process is started when the connection between the output device 110 and the input device 120 is detected, and is terminated when a successful matching result (or a zero mismatch result) is detected. In other words, the charging voltage value provided by the output device 110 is compatible with that of the input device 120. Thus, the charging process would proceed smoothly. In another embodiment, the handshake process is terminated when a failed matching result has been detected more than once. In other embodiments, a handshake process is started when the connection between the output device 110 and the input device 120 is detected, and terminated when one failed matching (or mismatch) result is detected. That means the charging voltage value provided by the output device 110 is not compatible with that of the charging voltage value and the charging current value for the input device 120. Therefore, the charging of the input device 120 is inhibited.

During operation, at a time after the connection between the output device 110 and the input device 120 is detected and before the output device 110 starts to charge the input device 120, the handshake control device 206 of the output device 110 is configured to perform the handshake process with the handshake control unit 124 of the input device 120 so that the output voltage value and output current value can be determined. The handshake control unit 206 is configured to generate a signal comprising a charging capability list containing at least a predetermined voltage value, and transmit the signal to the handshake control unit 124 of the input device 120 via the first I/O port 116.

Subsequently, in some embodiments, the handshake control unit 124 is configured to select one voltage value from the predetermined voltage values as a selected voltage value compatible with the input device 120 according to the charging characteristics of the power storage unit 126. Further, the transmission control unit 124 is configured to send a signal containing the selected voltage value to the handshake control unit 206 of the transmission control unit 114 via the second I/O port 122. After the handshake control unit 206 receives the signal containing the selected voltage value, the matching result of the handshake process is determined as successful (i.e., zero-mismatch).

In other embodiments, the handshake control unit 124 is configured to determine that none of the predetermined voltage values fulfill the charging requirement based on the charging characteristics of the input device 120. In that case, the handshake control unit 124 is configured to send the handshake control unit 206 a signal containing a failed matching result. When the signal containing the failed matching result is received, the handshake control unit 206 is configured to determine the handshake process as failed (mismatch), and transmit a signal containing the failed matching result to the matching management unit 202 of the transmission control unit 114.

In response to the failed matching result, the matching management unit 202 is configured to send a request for resuming the matching to the handshake control unit 206. Then, in response to the resuming request, the handshake control unit 206 is configured to send a signal to return the voltage values.

Afterward, the handshake control unit 124 is configured to transmit a signal, including an updated selected voltage value, to the handshake control unit 206. Subsequently, the handshake control unit 206 transmits a signal to the handshake control unit 124, and the updated selected voltage value is different from the previous predetermined voltage values. Upon receiving the updated selected voltage value transferred by the handshake control unit 206, the handshake control unit 124 is configured to transmit a successful matching result to the handshake control unit 206. That means the input device 120 agrees to use the updated selected voltage value as the charging voltage value. After receiving the signal containing the successful matching result, the handshake control unit 206 is configured to choose the updated selected voltage value as the charging voltage value.

Additionally, the handshake control unit 124 is configured to perform the handshake process in order to determine the output current value. The maximum output current value of the voltage converter 112 is based on the capability of the voltage converter 112. In some embodiments, the handshake control unit 124 is configured to embed an output current value in the transmitted signal containing a returned voltage value to the handshake control unit 206. In that case, upon receiving a signal containing a successful matching result, the handshake control unit 206 determines that the output current value is the maximum charging current value.

In some embodiments, the output device 110 further comprises a signal transceiving unit to convert the analog-valued handshake signals that are transmitted and received during the handshake process into digital forms to accomplish conversion between digital and analog domains. The signal transceiving unit comprises a physical layer unit and a protocol layer unit, configured to conduct signal processing and encoding/decoding of the handshake signals that are transmitted through the first I/O port 116 and the second I/O port 122.

Furthermore, the handshake process in the present disclosure defines a lookup table or a mapping table for providing digital formats of the output voltage value and the output current value. As previously discussed, the handshake control unit 206 is configured to transmit the predetermined voltage value to the handshake control unit 114, where the predetermined voltage value is of digital form selected from the lookup table.

Additionally, the lookup table also defines a minimum digital voltage value, a maximum digital voltage value, and a differential voltage value between two consecutive digital voltage values which the handshake process can support. Similarly, the lookup table defines a minimum digital current value, a maximum digital current value, and a differential current value between two consecutive digital current values which the handshake process can support. For example, the lookup table defines a group of octet voltage values and a group of octet current values, where the octet number 0x00000000 denotes the minimum voltage value as 0 Volts, the octet number 0x11111111 denotes the maximum voltage value as 25.5 Volts, and the differential voltage value is 0.1 Volts. The group of the current value can be encoded in a similar way for the voltage value.

In some embodiments, the handshake control unit 206 is configured to provide the predetermined charging capability list. The predetermined charging capability list can be updated by overwriting the existing voltage values or adding voltage values, and the overwritten or added voltage values are selected from the lookup table. In some embodiments, the charging capability list is updated by the handshake control unit 206. For example, after a failed matching result is received, the handshake control unit 206 is configured to decide on an updated voltage value from the lookup table based on the selected voltage value transmitted by the handshake control unit 124, and overwrite the capability list with the updated voltage value or add the updated voltage value to the capability list.

The output adaptation unit 204, coupled to the handshake control unit 206, is configured to receive the digital voltage value and digital current value, and adjust the output voltage value of the voltage converter 112 into an analog voltage value with respect to the digital voltage value.

Figure 3A:
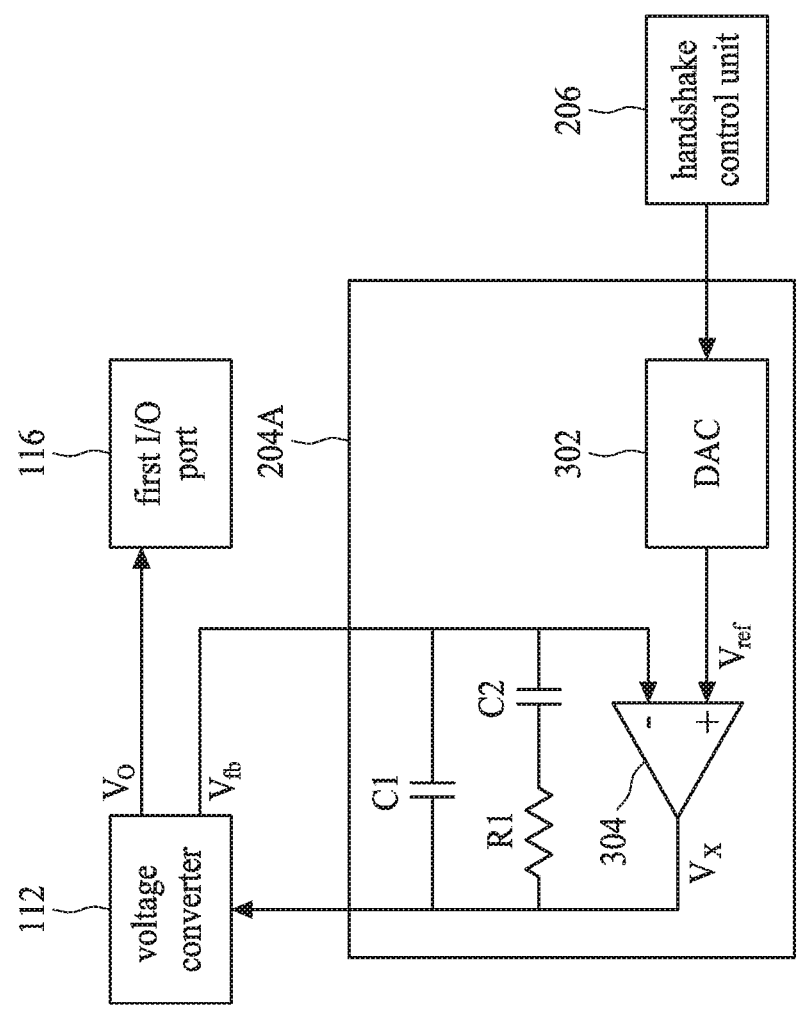
FIG. 3A is a block diagram of an output adaptation unit in accordance with some embodiments.

FIG. 3A is a block diagram of an output adaptation unit 204A in accordance with some embodiments. Referring to FIG. 3A, the matching adaptation unit 204A includes a digital-to-analog converter (DAC) 302 and an operational amplifier 304. The DAC 302 includes an input terminal and an output terminal. The input terminal is configured to receive a digital voltage value corresponding to a predetermined voltage value or an updated voltage value through the lookup table. The predetermined voltage value or the updated voltage value is transmitted by the handshake control unit 206, and a corresponding analog voltage value Vref is provided at the output terminal.

The operational amplifier 304 includes an inverting input (−) coupled to a feedback voltage Vfb, a non-inverting input (+) coupled to the DAC 302, and an output Vx coupled to a feedback circuit (not shown) of the voltage converter 112. In addition, the output Vx of the operational amplifier 304 is coupled to the feedback voltage Vfb through a first capacitor C1, a resistor R1 and a second capacitor C2. In addition, the voltage converter 112 includes a power output Vo, a feedback output Vfb and a feedback input. During operation, the voltage converter 112 is configured to send the feedback voltage Vfb via the feedback output, wherein the feedback voltage Vfb is obtained by dividing the voltage of the power output by a voltage dividing circuit (not shown). When the output voltage Vo at the power output of the converter output 112 stays at its transient state, the operational amplifier 304 provides an adjustment signal Vx to the voltage converter 112 for voltage adaptation. Subsequently, when the output voltage Vo attains its steady state, both of the input voltages of the operational amplifier 304 are equal, i.e., Vfb=Vref. In that case, the output voltage Vo of the power output is equal to the voltage input from the handshake control unit 206.

Figure 3B:
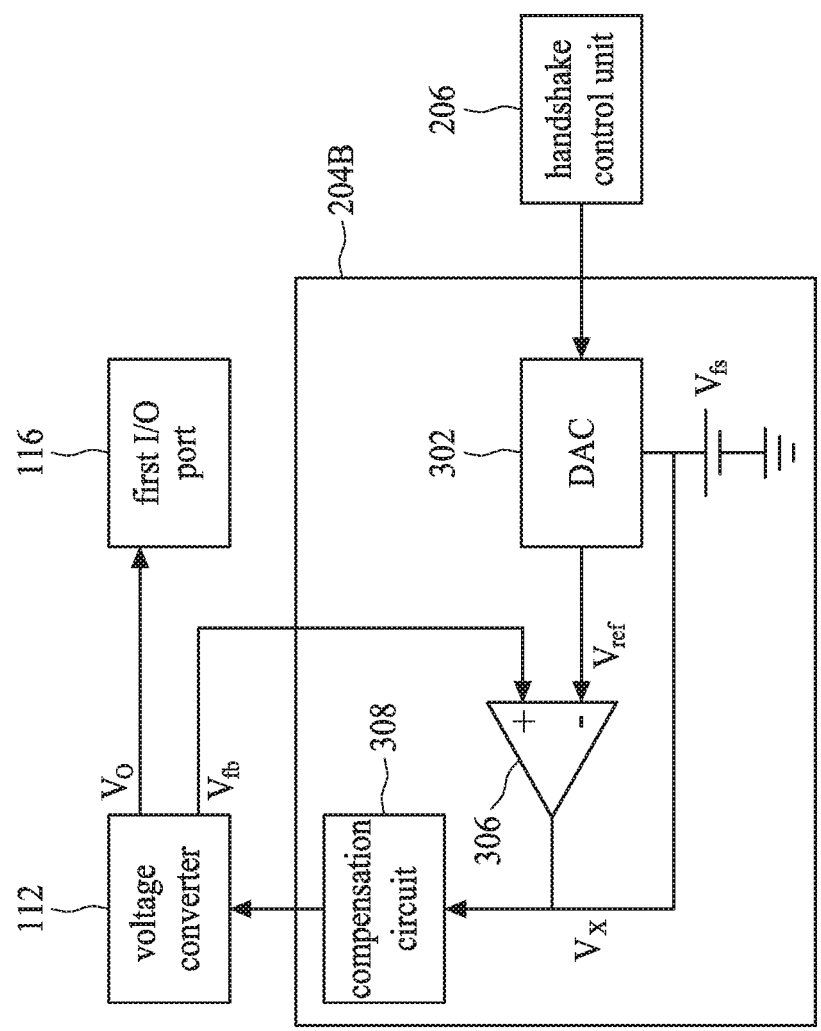
FIG. 3B is a block diagram of another output adaptation unit in accordance with some embodiments.

FIG. 3B is a block diagram of the output adaptation unit 204B in accordance with some embodiments. Referring to FIG. 3B, an output adaptation unit 204B includes the DAC 302, a comparator 306 and a compensation circuit 308. The comparator 306 comprises an inverting input (−) coupled to the DAC 302, a non-inverting input (+) coupled to the feedback output Vfb of the voltage converter 112, and an output Vx coupled to the compensation circuit 308. In addition, the compensation circuit 308 of the matching adaptation unit 204B is coupled to a feedback circuit (not shown) of the voltage value convertor 112, and the output Vx of the comparator 306 is coupled to a full-scale voltage Vfs of the DAC 302. The voltage converter 112 is configured to send the feedback voltage Vfb via the feedback output, wherein the feedback voltage value Vfb is obtained by dividing the voltage at the power output via a voltage dividing circuit (not shown). During operation, when the voltage Vo of the power output for the converter output 112 stays at its transient state, the comparator 306 provides an adjustment signal Vx to the voltage converter 112 via the compensation circuit 308 for voltage adaptation. Subsequently, when the voltage Vo attains its steady state, both of the input voltages of the comparator 306 are equal, i.e., Vfb=Vref. In that case, the output voltage Vo of the power output is equal to the voltage input by the handshake control unit 206.

Figure 4:
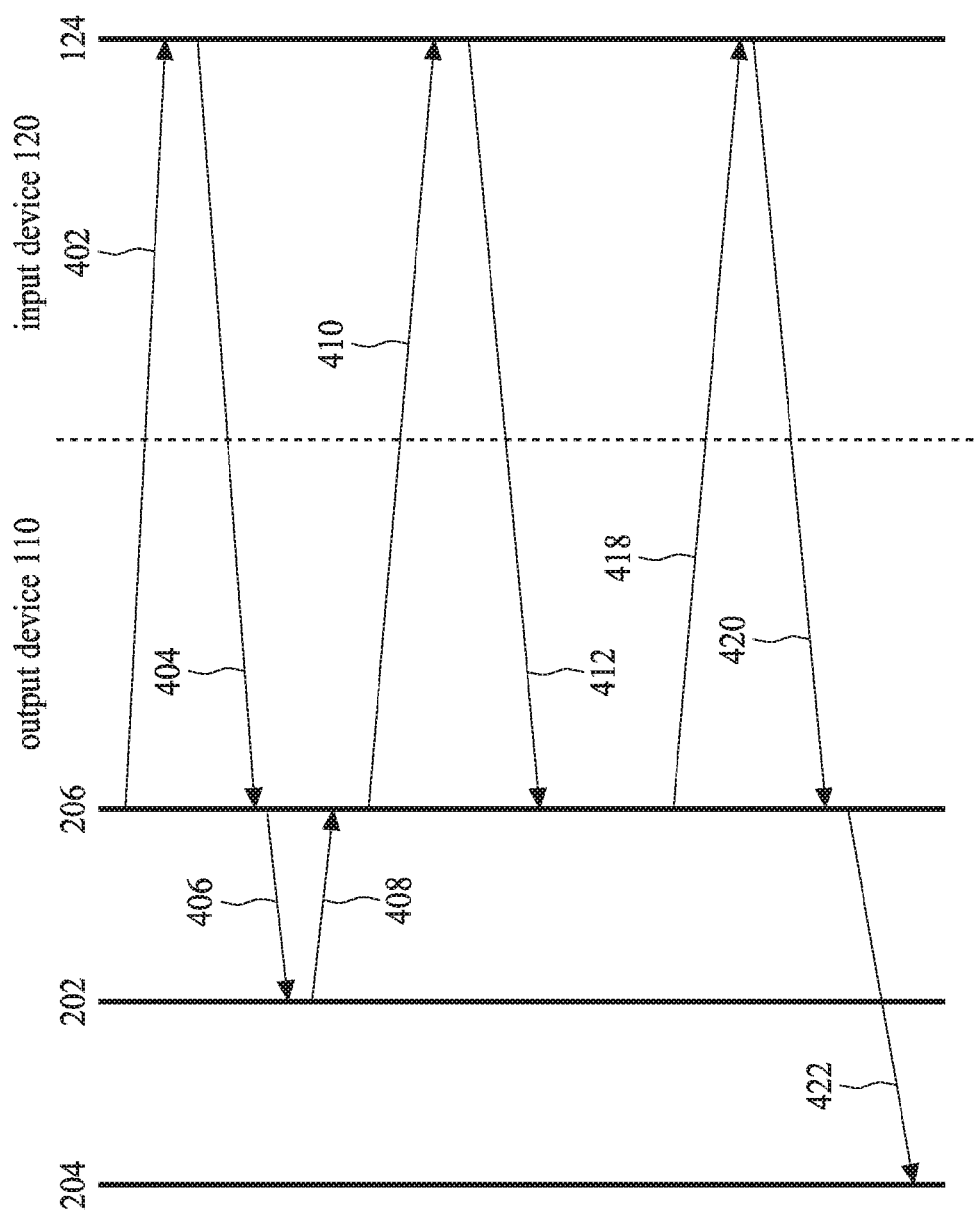
FIG. 4 is a flow diagram of a matching process in accordance with some embodiments.

FIG. 4 is a flow diagram of a matching process in accordance with some embodiments. In operation 402, the handshake control unit 206 is configured to transmit a first signal comprising a predetermined voltage value to the handshake control unit 124. In operation 404, in response to the first signal, the handshake control unit 124 is configured to transmit a second signal comprising a failed matching result to the handshake control unit 206. In some embodiments, the second signal further comprises a charging capability list comprising a predetermined voltage value and a predetermined current value, e.g., (5V, 1 A).

In operation 406, in response to the second signal, the handshake control unit 206 is configured to transmit a third signal comprising the failed matching result to the matching management unit 202. In operation 408, the matching management unit 202 is configured to transmit a fourth signal to the handshake control unit 206 in response to the third signal, where the fourth signal comprises a request to resume matching.

In operation 410, in response to the fourth signal, the handshake control unit 206 is configured to send a fifth signal containing a request of returning voltage values to the handshake control unit 124. Then, in operation 412, in response to the fifth signal, the handshake control unit 124 is configured to transmit a sixth signal including a selected voltage value to the handshake control unit 206. In some embodiments, the selected voltage value is not listed on the charging capabilities list provided in the second signal, but is defined in the lookup table determined by the handshake process.

In operation 418, in response to the sixth signal, the handshake control unit 206 is configured to transmit a seventh signal including an updated voltage value to the handshake control unit 124. In some embodiments, the updated voltage value is selected from the lookup table. In other embodiments, the updated voltage value is different from the selected voltage value while still being compatible with the charging characteristics of the input device 120. In some embodiments, the seventh signal further comprises an updated current value.

In operation 420, in response to the seventh signal, the handshake control unit 124 is configured to transmit an eighth signal comprising a successful matching result to the handshake control unit 206. That means the output device 110 may use the updated voltage value as the predetermined output voltage value and the updated current value as the maximum output current value. Next, in operation 422, in response to the eighth signal, the handshake control unit 206 is configured to inform the output adaptation unit 204 to start charging. In some embodiments, the output adaptation unit 204 charges the input device 120 with a first voltage value. In other embodiments, the output adaptation unit 204 charges the input device 120 with the updated current value. The flow diagram of the handshake process illustrated in FIG. 4 is only an exemplary embodiment. Moderate modification to the disclosed embodiments, for example, by interchanging the order of operations or performing the operations at the same time, still falls within the spirit and scope of the present invention.

Figure 5:
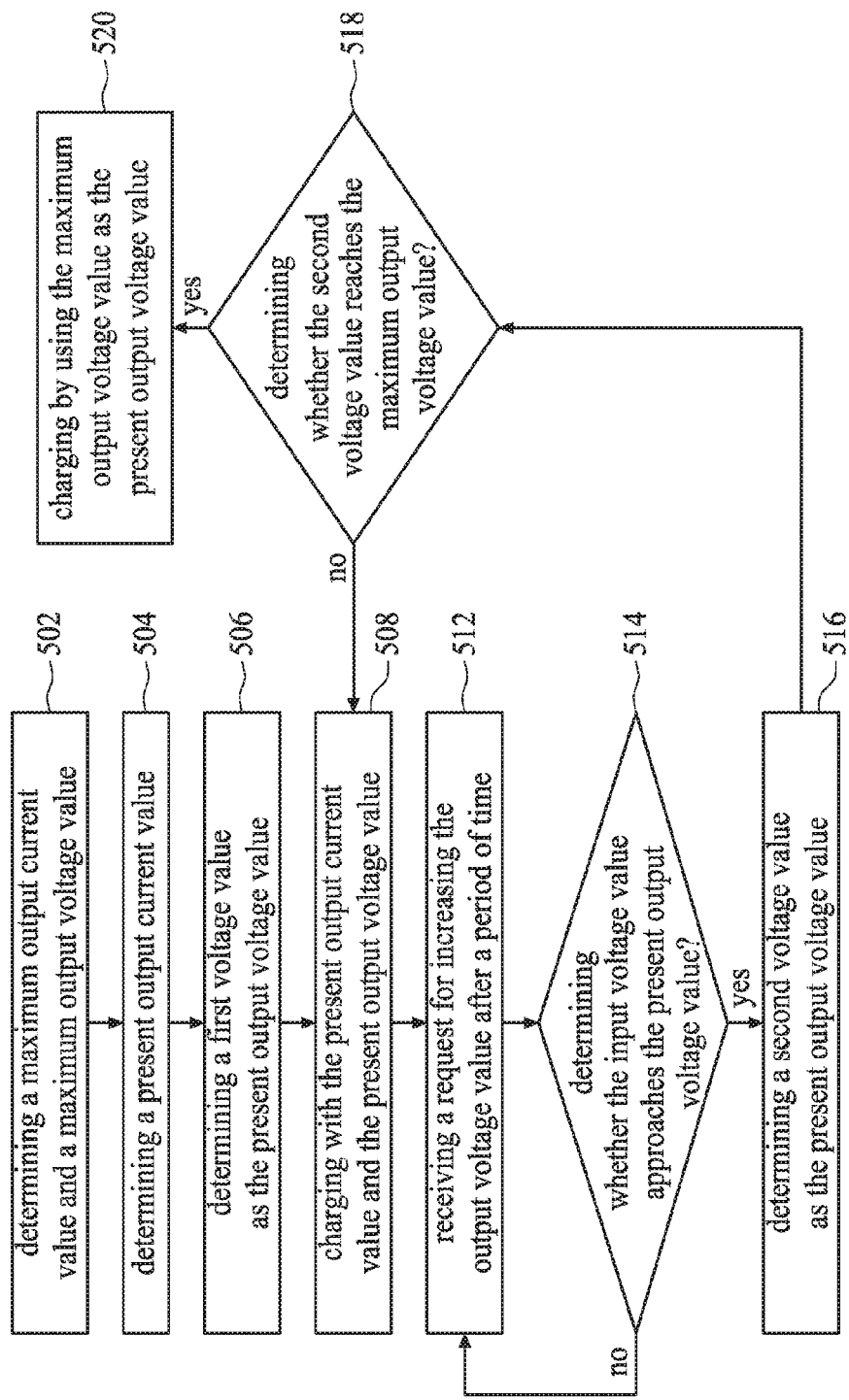
FIG. 5 is a flow diagram of a charging method in accordance with some embodiments.

FIG. 5 is a flow diagram of a charging method in accordance with some embodiments. In operation 502, a maximum output current value and a maximum output voltage value are determined. The maximum output current value and the maximum output voltage value are determined according to a completed handshake process performed by the handshake control unit 206 of the output device 110 and the handshake control unit 124 of the input device 120 as illustrated in FIG. 4 and accompanying descriptions, and are finalized after a successful matching result is obtained. Next, in operation 504, the handshake control unit 206 determines a present output current value not greater than the maximum output current value. In some embodiments, the present output current value is set as equal to the maximum output current value. In operation 506, the handshake control unit 206 determines a first voltage value as the present output voltage value, which is not greater than the maximum output voltage value and selected from the lookup table determined by the handshake process. In some embodiments, operation 504 may be performed simultaneously along with operation 506, or operation 504 may be performed after operation 506.

The present output current value and the first voltage value are determined by taking into account the charging requirement of the input device 120 as well as prevention of overheating caused by unduly large charging power during the charging process. In order to make the charging fast and safe, the first voltage value is variable and increases gradually, which starts from a low level until the maximum output voltage value is reached. In some embodiments, the present output current value is kept at its maximum output value during the charging process so that the charging period is kept short while alleviating the overheating condition.

In operation 508, the output device 110 selects the first voltage value and the maximum current value as the present output voltage value and the present output current value, respectively, for charging. Next, in operation 512, after a period of time, the handshake control unit 124 instructs the handshake control unit 206 to increase the output voltage value by means of the handshake process as discussed previously. There is a period of time between operation 508 and operation 512. During such period of time, the present input voltage of the power storage unit 126 increases gradually due to charging and approaches the first voltage value of the voltage converter 112. Meanwhile, the charging current decreases along with the increase of the internal resistance of the power storage unit 126. In some embodiments, in operation 512, the handshake control unit 206 is configured to increase the output voltage value via the matching management unit 202.

Next, in operation 514, the handshake control unit 206 determines whether the present input voltage value approaches the present output voltage value. If that is not the case, it is determined that the present input voltage value does not approach the first voltage value, and the process returns to operation 512 with repeating operations 512 and 514. If the result of operation 514 is affirmative, then operation 516 proceeds. In operation 516, a second voltage value is determined and updated as the present output voltage value, where the second voltage value is greater than the first voltage value. In some embodiments, operation 514 is performed based on the magnitude of the charging current of the power storage unit 126 as discussed previously. In some embodiments, the present input voltage value is determined as approaching the present output voltage value based on a criterion such as proportion or difference between voltages.

In operation 518, it is further determined (at present) whether the second voltage value has reached the maximum output voltage value. If the second voltage value has not reached the maximum output voltage value, the process returns to operation 508. In that case, the handshake control unit 206 is configured to update the present output voltage value by the second voltage value, and continues to charge the input device 120. The second voltage value selected from the lookup table is greater than the first voltage value while not being greater than the maximum output voltage value.

In operation 518, if it is determined that the second voltage value reaches the maximum output voltage value, then operation 520 proceeds. In operation 520, the maximum output voltage value is used as a fixed value for charging the input device 120. In some embodiments, the output device 110 is configured to gradually reduce the output current after the maximum output voltage value is reached until the charging process is completed. In other words, the charging process would pass through a transient period and come to a complete stop.

FIGS. 6A-6B are schematic views of voltage and current values for the charging method illustrated in FIG. 5, in accordance with some embodiments. Referring to FIG. 6A, a maximum output voltage is denoted by Vm. Referring to FIG. 6B, a maximum current is denoted by Im. Also shown in FIGS. 6A and 6B, dotted lines 602 and 610 represent the variation of the present voltage and current values, respectively, of a conventional fast charging method. The present voltage 602 rises quickly at the beginning of charging, and the power storage unit 126 reaches the maximum output voltage Vm at time t1. Consequently, the charging current 610 decreases gradually after time t1. This approach may save the charging time, but the discrepancy between the present voltage of the output device 110 and the input voltage is too large. That would cause most of the transmitted power to dissipate by heat, thereby resulting in overheating of the power storage unit 126. To prevent the power storage unit 126 from overheating, the present current 610 is thus configured at a lower level in the beginning of charging and gradually increases afterward; but the charging efficiency is reduced accordingly.

Further, referring to FIGS. 6A and 6B, dashed lines 606 and 612 denote the variation of the voltage and current values, respectively, for another existing method. In that method, the rising rate of the present voltage line 606 is slower than that for the present voltage line 602; and the present current line 612, associated with the present voltage 606, is set to be lower than the maximum current Im for charging. With such a charging approach, the power storage unit 126 reaches its maximum charging voltage value Vm at time t2, and the charging current as denoted by the line 612 thus decreases gradually after time t2. Such approach eliminates unnecessary power consumption, while resulting in prolonged charging time.

Also referring to FIGS. 6A and 6B, solid lines 604 and 608 respectively show the performance of the proposed charging scheme illustrated in FIG. 5 regarding the present voltage and current values. Unlike the existing charging methods previously discussed, during the charging process, the present output voltage of the output device 110 is determined based on the present voltage value of the input device 120 or the charging current, and is selected from the lookup table with one value closest to the present voltage value. Moreover, the present current value (denoted by the line 608) corresponding to the present voltage value is determined to equal the maximum output current value. With the charging method of the present disclosure, the charging voltage reaches its maximum Vm at time t1, and the present current (denoted by the line 608) decreases gradually after time t1. By help of the handshake process performed between the handshake control unit 206 and the handshake control unit 124, the charging scheme of the present disclosure alleviates excess power loss caused by excess voltage value difference in charging. As opposed to other methods, the present current value (denoted by the line 608) is maintained as the maximum current value Im, which shortens the charging time.

In the present disclosure, an electronic device comprises: a voltage converter configured to provide an output having an output voltage value and an output current value; a handshake control unit, coupled to the voltage converter, configured to perform a handshake process for a charging voltage value and receive a matching result of the handshake process; and a matching management unit, coupled to the handshake control unit, configured to send a first request for resuming matching to the handshake control unit in response to the matching result as being failed.

In some embodiments, the handshake control unit is configured to send a first signal comprising a second request for returning voltage values.

In some embodiments, the handshake control unit is configured to receive a second signal comprising a selected voltage value.

In some embodiments, the handshake control unit is configured, in response to the selected voltage value, to determine the output voltage value and the output current value.

In some embodiments, the handshake control unit is configured to start charging a power storage device with the first current value and a first voltage value, wherein the first voltage value is lower than the output voltage value.

In some embodiments, the handshake control unit is configured to determine a second voltage value based on a present voltage value in the power storage device, and charge with the output current value and the second voltage value, wherein the second voltage value is greater than the present voltage value.

In some embodiments, the selected voltage value, the output voltage value, the first voltage value, and the second voltage value are selected from a lookup table defined by the handshake process.

In some embodiments, the electronic device further comprises an output adaptation unit coupled to the voltage converter and the handshake control unit, wherein the output adaptation unit is configured to receive a feedback voltage value from the voltage converter and send an adjustment signal to the voltage converter.

In some embodiments, the output adaptation unit includes a digital-to-analog converter (DAC) coupled to the handshake control unit, wherein the DAC is configured to output an analog value.

In some embodiments, the output adaptation unit further comprises a comparator coupled to the voltage converter, wherein the comparator is configured to compare the feedback voltage value with the analog value and output the adjustment signal to the voltage converter.

In the present disclosure, a handshake method for charging comprises: sending a first signal comprising at least a predetermined voltage value; receiving a second signal comprising a first matching result; and sending a first request for resuming matching in response to the matching result as being failed.

In some embodiments, the handshake method further comprises sending a third signal comprising a second request for returning voltage values in response to the first request.

In some embodiments, the handshake method further comprises receiving a fourth signal comprising a selected voltage value in response to the third signal.

In some embodiments, the handshake method further comprises sending a fifth signal comprising an output voltage value and an output current value in response to the fourth signal.

In some embodiments, the selected voltage value and the output voltage value are selected from a lookup table or mapping table.

In the present disclosure, a charging method comprises: determining an output current value and an output voltage value; charging with the output current value and a first voltage value to a power storage unit, wherein the first voltage value is lower than the output voltage value; determining a second voltage value greater than the first voltage value in response to a present voltage value of the power storage unit approaching the first voltage value; and charging with the output current value and the second voltage value.

In some embodiments, the present voltage value is obtained via a handshake process.

In some embodiments, the output current value and the output voltage value are obtained via the handshake process.

In some embodiments, the first voltage value and the second voltage value are selected from a lookup table determined by the handshake process.

In some embodiments, the charging method further comprises comparing the second voltage value with the output voltage value, and charging the power storage unit in response to the second voltage value being no lower than the output voltage value.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
   a voltage converter configured to provide an output having an output voltage value and an output current value;
   a handshake control unit, coupled to the voltage converter, configured to perform a handshake process for a charging voltage value and receive a matching result of the handshake process; and
   a matching management unit, coupled to the handshake control unit, configured to send a first request for resuming matching to the handshake control unit in response to the matching result as being failed.

2. The electronic device according to claim 1, wherein the handshake control unit is configured to send a first signal comprising a second request for returning voltage values.

3. The electronic device according to the claim 2, wherein the handshake control unit is configured to receive a second signal comprising a selected voltage value.

4. The electronic device according to claim 3, wherein the handshake control unit is configured, in response to the selected voltage value, to determine the output voltage value and the output current value.

5. The electronic device according to claim 4, wherein the handshake control unit is configured to start charging a power storage device with the first current value and a first voltage value, the first voltage value being lower than the output voltage value.

6. The electronic device according to claim 5, wherein the handshake control unit is configured to determine a second voltage value based on a present voltage value in the power storage device, and charge the power storage device with the output current value and the second voltage value, the second voltage value being greater than the present voltage value.

7. The electronic device according to claim 6, wherein the selected voltage value, the output voltage value, the first voltage value, and the second voltage value are selected from a lookup table determined by the handshake process.

8. The electronic device according to claim 1, further comprising an output adaptation unit coupled to the voltage converter and the handshake control unit, the output adaptation unit configured to receive a feedback voltage value from the voltage converter and send an adjustment signal to the voltage converter.

9. The electronic device according to claim 8, wherein the output adaptation unit includes a digital-to-analog converter (DAC) coupled to the handshake control unit, the DAC configured to output an analog value.

10. The electronic device according to claim 9, wherein the output adaptation unit further comprises a comparator coupled to the voltage converter, the comparator configured to compare the feedback voltage value with the analog value and output the adjustment signal to the voltage converter.

11. A charging method, comprising:
    determining an output current value and an output voltage value;
    charging with the output current value and a first voltage value to a power storage unit, the first voltage value being lower than the output voltage value;
    determining a second voltage value greater than the first voltage value in response to a present voltage value of the power storage unit approaching the first voltage value; and
    charging with the output current value and the second voltage value.

12. The charging method according to claim 11, wherein the present voltage value is obtained via a handshake process.

13. The charging method according to claim 12, wherein the output current value and the output voltage value are obtained via the handshake process.

14. The charging method according to claim 12, wherein the first voltage value and the second voltage value are selected from a lookup table determined by the handshake process.

15. The charging method according to claim 11, further comprising comparing the second voltage value with the output voltage value, and charging the power storage unit with the output voltage value in response to the second voltage value reaching the output voltage value.

* * * * *